IIIII

US010839414B2

(12) United States Patent
Desfontaines et al.

(10) Patent No.: US 10,839,414 B2
(45) Date of Patent: Nov. 17, 2020

(54) METHOD AND SYSTEM FOR DETERMINING OPTIMAL INCENTIVES FOR CUSTOMERS TO REDUCE QUEUEING WAIT TIME WITH WAIT-TIME-DEPENDENT INCENTIVE CHOICE PROBABILITIES

(71) Applicant: International Business Machines Corporation, Armonk, NY (US)

(72) Inventors: Lucie Suzanne Marie Catherine Desfontaines, Douai (FR); Laura Wynter, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 15/288,550

(22) Filed: Oct. 7, 2016

(65) Prior Publication Data
US 2018/0101859 A1 Apr. 12, 2018

(51) Int. Cl.
*G06Q 30/02* (2012.01)
(52) U.S. Cl.
CPC .............................. *G06Q 30/0235* (2013.01)
(58) Field of Classification Search
None
See application file for complete search history.

(56) References Cited

U.S. PATENT DOCUMENTS

| | | | | | |
|---|---|---|---|---|---|
| 2009/0271275 | A1* | 10/2009 | Regmi | ............... | G06Q 30/0238 705/14.73 |
| 2009/0313062 | A1* | 12/2009 | Natsuyama | .......... | G06Q 10/025 705/5 |
| 2012/0116863 | A1* | 5/2012 | Boss | .................. | G06Q 30/0235 705/14.35 |
| 2014/0122040 | A1* | 5/2014 | Marti | ...................... | G06F 30/20 703/6 |
| 2015/0081348 | A1 | 3/2015 | Avera et al. | | |
| 2015/0134418 | A1 | 5/2015 | Leow et al. | | |
| 2016/0110591 | A1* | 4/2016 | Smith | ................ | G06K 9/00778 382/103 |
| 2016/0148238 | A1* | 5/2016 | He | ..................... | G06Q 30/0224 705/14.1 |

OTHER PUBLICATIONS

"Incentive-Compatible Revenue Management in Queuing Systems: Optimal Strategic Idleness and other Delaying Tactics" (Philipp Afeche, Kellogg School of Management Jan. 2004) (Year: 2004).*

* cited by examiner

*Primary Examiner* — James M Detweiler
(74) *Attorney, Agent, or Firm* — Harrington & Smith

(57) ABSTRACT

A method is provided for determining a number of current customers in a queue for a first event; estimating a current wait time of the queue for a new customer based at least on the number of current customers in the queue; predicting a future wait time of the queue for the new customer, if the new customer entered the queue after completing at least one second event prior to entering the queue of the first event, wherein estimating the future wait time is based at least on a probability of one or more future customers performing the at least one second event prior to entering the queue; determining an incentive for the new customer to complete the at least one second event prior to entering the queue based at least on the current wait time and the future wait time; and sending the incentive to the customer.

12 Claims, 10 Drawing Sheets

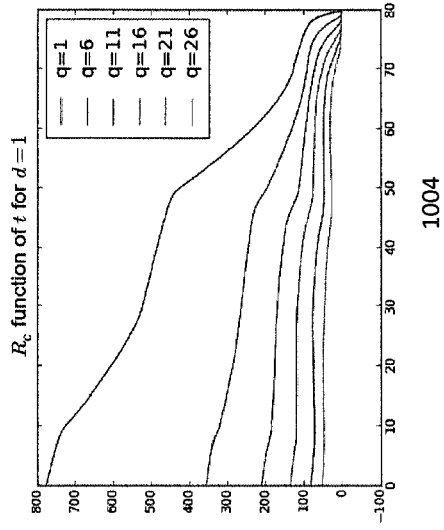
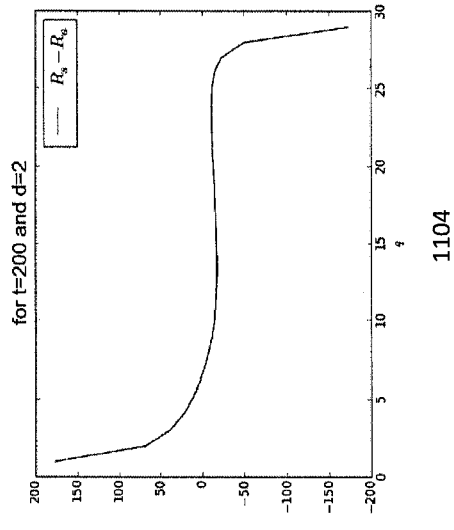
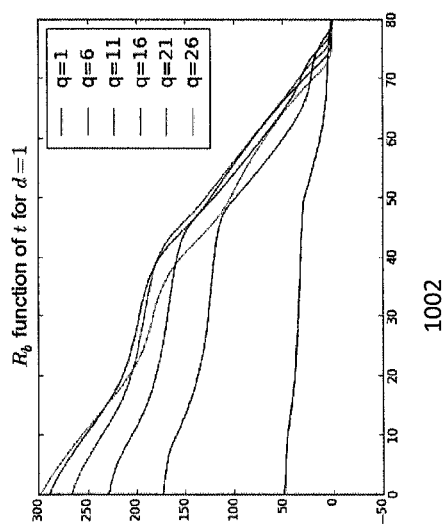
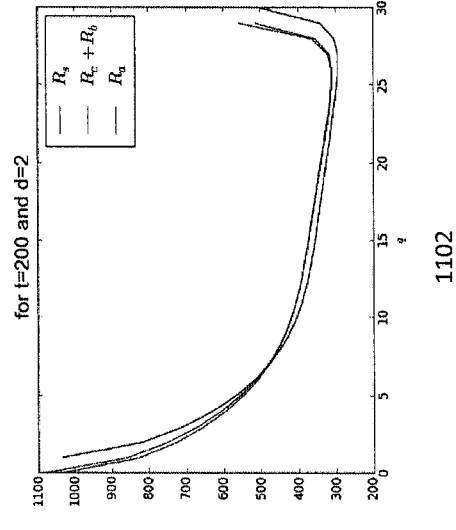
FIG. 10
FIG. 11

METHOD AND SYSTEM FOR DETERMINING OPTIMAL INCENTIVES FOR CUSTOMERS TO REDUCE QUEUEING WAIT TIME WITH WAIT-TIME-DEPENDENT INCENTIVE CHOICE PROBABILITIES

BACKGROUND

This invention relates generally to managing wait times, more specifically, relates to determining optimal incentives for customers to reduce queueing wait time with wait-time-dependent incentive choice probabilities.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be, prior art by inclusion in this section.

Typically, customers wishing to use a unique service arrive randomly over time and enter a line or a queue. For example, passengers in an airport having just landed their flight must wait in various queues that result from the airport setting, such as a taxi queue for arriving passengers. During periods of heavy arrivals, the current system leads to long waiting times for the passengers in the queue, and as such can be very inefficient.

BRIEF SUMMARY

This section is intended to include examples and is not intended to be limiting.

In one example embodiment, a method comprises: determining a number of current customers in a queue for a first event; estimating a current wait time of the queue for a new customer based at least on the number of current customers in the queue; predicting a future wait time of the queue for the new customer, if the new customer entered the queue after completing at least one second event prior to entering the queue of the first event, wherein estimating the future wait time is based at least on a probability of one or more future customers performing the at least one second event prior to entering the queue; determining an incentive for the new customer to complete the at least one second event prior to entering the queue based at least on the current wait time and the future wait time; and sending the incentive to the customer.

In another example embodiment, an apparatus comprises: one or more memories comprising computer-readable code, and one or more processors, wherein the one or more processors are configured, in response to execution of the computer-readable code, to cause the apparatus to: determine a number of current customers in a queue for a first event; estimate a current wait time of the queue for a new customer based at least on the number of current customers in the queue; predict a future wait time of the queue for the new customer, if the new customer entered the queue after completing at least one second event prior to entering the queue of the first event, wherein estimating the future wait time is based at least on a probability of one or more future customers performing the at least one second event prior to entering the queue; determine an incentive for the new customer to complete the at least one second event prior to entering the queue based at least on the current wait time and the future wait time; and send the incentive to the customer.

In another example embodiment, a computer program product is provided for determining optimal incentives for customers to reduce queueing wait time with wait-time-dependent incentive choice probabilities, the computer program product comprising a computer readable storage medium having program instructions embodied therewith, the program instructions executable by a device to cause the device to: determine a number of current customers in a queue for a first event; estimate a current wait time of the queue for a new customer based at least on the number of current customers in the queue; predict a future wait time of the queue for the new customer, if the new customer entered the queue after completing at least one second event prior to entering the queue of the first event, wherein estimating the future wait time is based at least on a probability of one or more future customers performing the at least one second event prior to entering the queue; determine an incentive for the new customer to complete the at least one second event prior to entering the queue based at least on the current wait time and the future wait time; and send the incentive to the customer.

BRIEF DESCRIPTION OF THE DRAWINGS

In the attached Drawing Figures:

FIGS. 9 and 10 show examples graphs for transfer contract values in accordance with exemplary embodiments;

FIG. 11 show examples graphs showing cost transfer between an organizing agent and a service agent in accordance with exemplary embodiments;

DETAILED DESCRIPTION

In the Summary above and in the Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular embodiment of the invention, or a particular claim, that feature can also be used, to the extent possible, in combination with and/or in the context of other particular aspects and embodiments of the invention, and in the invention generally.

When reference is made herein to a method comprising two or more defined steps, the defined steps can be carried out in any order or simultaneously (except where the context excludes that possibility), and the method can include one or more other steps which are carried out before any of the defined steps, or after all of the defined steps (except where the context excludes that possibility).

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for determining optimal incentives for customers to reduce queueing wait time with wait-time-dependent incentive choice probabilities. Additional description of these techniques is presented after a system into which the exemplary embodiments may be used is described.

The term 'service agent' as used herein may include an organization, person, entity, or the like such that the service agent offers some unique service to a customer. An 'organizing agent' as used herein may include an organization, person, entity, or the like, where the organizing agent has some relation to both the customers and the service agent. For example, the service agent may operate on or adjacent to a premises of the organizing agent. One non-limiting example is a taxi service and an airport.

The term 'customer' as used herein may refer to a person, user, entity, that intends to join a waiting queue as described by exemplary embodiments. In some cases, a customer may refer to a device of the customer. One non-limiting example is a passenger arriving at the airport that uses the taxi service.

Figure 1:
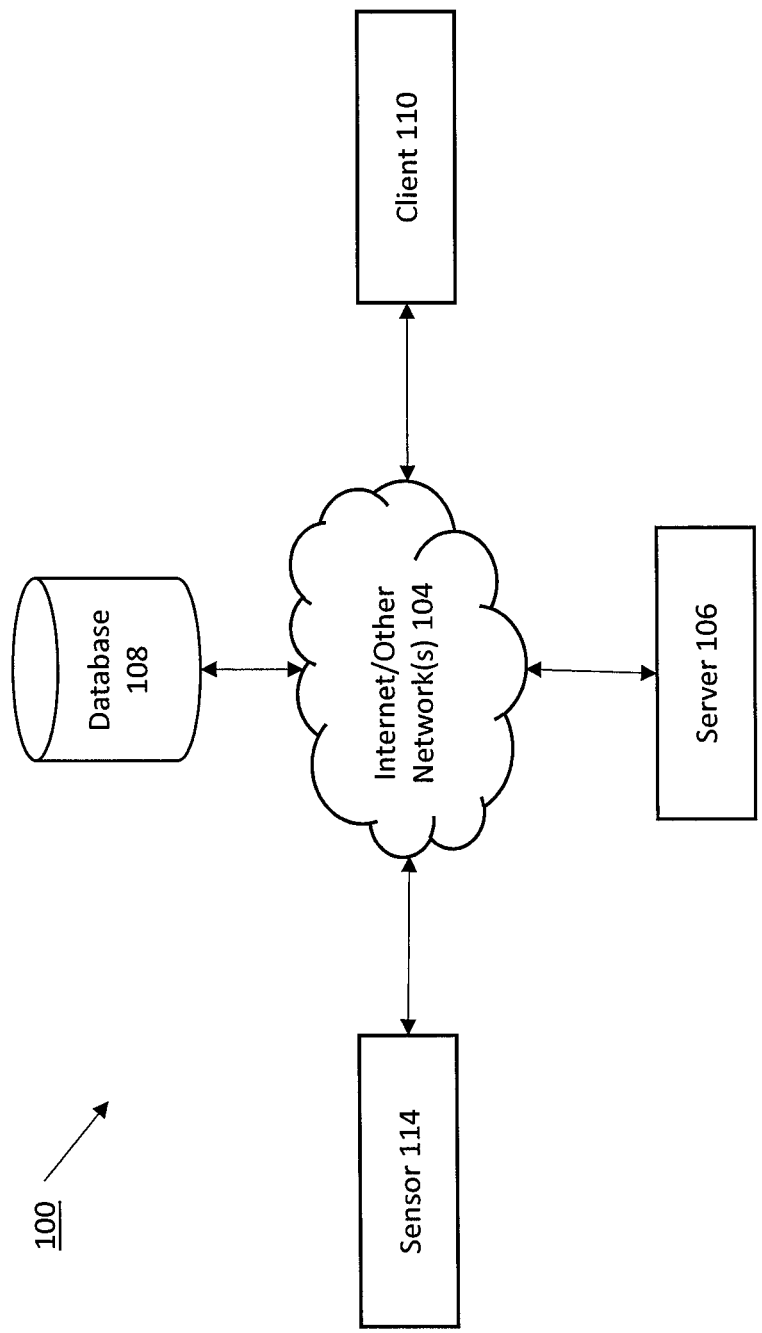
FIG. 1 is a block diagram of one possible and non-limiting exemplary computing environment in which the exemplary embodiments may be practiced.

Referring now to FIG. 1, a simplified block diagram of an example system environment 100 in which exemplary embodiments may be implemented. FIG. 1 illustrates one possible example and there are many others, such as systems with webservers, application servers, and cloud applications and servers. The example system environment shown in FIG. 1 includes a server 110, a database 108, a client 110, a sensor 114, and a network 104. It should also be understood that the exemplary system environment 100 could also have more or less clients, databases, sensors, and servers for example. The client, servers, and databases may communicate over one or more networks 104. For instance, the network 104 could be or include a local area network (LAN), a wide area network (WAN), the Internet, or the "cloud", e.g., and the server could be a webserver or a cloud-based server. It should also be understood, that in some examples that at least some of the various entities could be combined. For example, the client 110 may include a sensor 114; a server 106 may include a database 108, etc.

The sensor 114 may comprises one or more of: a motion sensor (such as infrared light, ultrasound, or microwave/radar technology for example); a proximity sensor (such as ultrasonic sensors, photoelectric for example); and an image sensor (such as imaging devices based on imaging devices based on CCD or CMOS technology for example).

Figure 2:
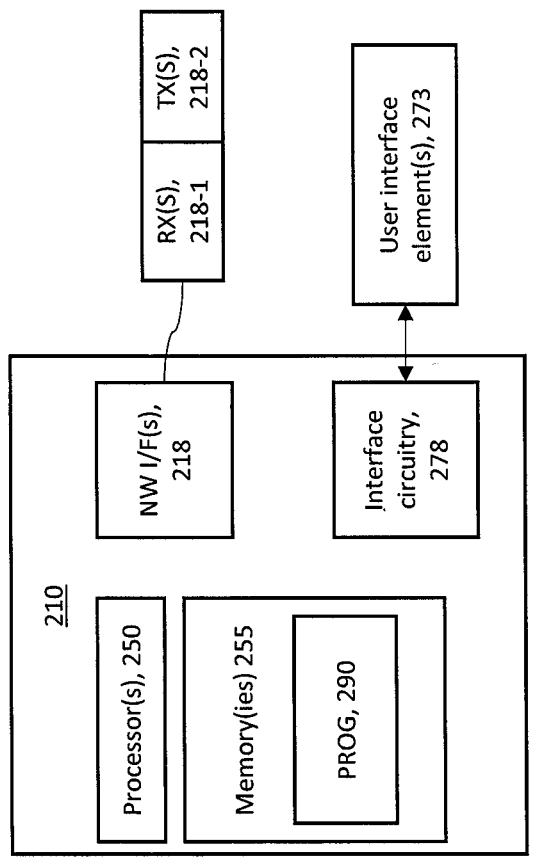
FIG. 2 is a high level block diagram of a computer system which may be used in the various electronic devices and apparatuses that are suitable for use in practicing the exemplary embodiments described herein.

Referring now to FIG. 2, this figure shows a high level block diagram of a computer system 210 which may be used in the various electronic devices and apparatuses that are suitable for use in practicing the exemplary embodiments described herein, such as any of client 110, or server 106 of FIG. 1 for example. The computer 210 includes a controller, such as a computer or a data processor(s) 250 and a computer-readable memory or medium embodied as a memory(ies) 255 that stores a program of computer instructions (PROG) 290. The PROG 290 includes program instructions that, when executed by the associated processor(s) 250, enable the various electronic devices and apparatuses to operate in accordance with exemplary embodiments. That is, various exemplary embodiments may be implemented at least in part by computer software executable by the processors 250 of the computer 210, or by hardware, or by a combination of software and hardware (and firmware).

The memory(ies) 255 may be of any type suitable to the local technical environment and may be implemented using any suitable data storage technology, such as semiconductor based memory devices, flash memory, magnetic memory devices and systems, optical memory devices and systems, fixed memory, and removable memory. The processor(s) 250 may be of any type suitable to the local technical environment, and may include one or more of general purpose computers, special purpose computers, microprocessors, digital signal processors (DSPs), and processors based on a multicore processor architecture, as non-limiting examples.

In this example, the computer 210 also comprises one or more network (N/W) interfaces (I/F(s)) 218, interface circuitry 278, and may include or be connected to interface elements 273. A server, depending on implementation, may only be accessed remotely (e.g., via a N/W IF 218), and as such would not use the interface elements 273, which could include a display, keyboard, mouse, and the like. It is also noted that a "computer system" as this term is used herein may include multiple processors and memories, e.g., in a cloud-based system.

The NW I/F(s) 218 may be wired and/or wireless and communicate over the Internet/other network(s) via any communication technique. In this example, the NW I/F(s) 218 comprise one or more transmitters 218-1, and one or more receivers 218-2. Such transmitters 218-1 and receivers 218-2 can be wireless radio frequency (RF) transmitters or receivers supporting, e.g., cellular or local or wide area network frequencies and protocols. The transmitters or receivers may also be wired and support wired protocols such as USB (universal serial bus), networks such as Ethernet, and the like. There may also be a combination of these protocols used.

Exemplary embodiments address the overall performance of systems involving waiting queues for one or more unique services. It should be understood that the embodiments are generally applicable to a variety of environments which involve waiting queues, such as amusements parks, sporting events, traffic jams, or the like. One example of such a setting is an airport, where many passengers arrive randomly with the ultimate goal of using a unique service, such as a taxi service for example.

If a customer had perfect information about current and future waiting times of a queue for some unique service, then the customer could make a decision to take a 'diversion' at the ideal time and perform the activity until the queue is sufficiently reduced at which point they would rejoin and be served. A diversion is some activity or event which some of the arriving customers can go to in order to reduce the number of passengers waiting in the main queue. The idea is that there are other activities that some of the passengers can perform instead of joining the queue immediately, and in so doing reap some benefit, and they would then rejoin the queue at a later time after performing the activity, when the queue is less busy. Example diversion activities include having a cup of coffee, making duty free retail purchases, going to an entertainment area in the airport, etc. In reality, however, customers do not have perfect information about future waiting times of a service. At best, customers may have an estimate of the current waiting time (i.e., if they were to join the queue immediately). Encouraging customers to forgo entering the queue immediately and rejoin later requires providing incentives. Accordingly, the queue organizer would need to know what level of incentive to offer to the customers and when, so as to optimally motivate their choices. Modeling such customer choice is not straightforward, however. On the one hand, human behavior while rational is clearly not deterministic. In addition, the waiting time for a queue in the future depends not only on the stochastic arrivals of customers and their stochastic behavior but also on the number of customers who opt to take the diversion. In other words, a decision that a customer makes as to whether to immediately enter the queue or accept to take a diversion depends on the decisions of customers arriving after the passenger faced with the same decision. The customer's choice depends on both the value of the incentive and their expected reduction of waiting time by taking the diversion, and potentially other factors such as the time of day, day of week, etc. In addition, the facility is often in a position to request more service agents. However, the additional agents would expect to know the likely number of customers to serve in the future, thus creating a further dependency in the decision process.

In an ideal system, the organizing agent (e.g. an airport) would optimize a global objective of the system and the service agent (e.g. a taxi service) would send exactly the number of resources needed to serve the people waiting in the service queue. In practice, however, the organizing agent and the service agent each attempt to optimize their own respective 'subsystems', and this often means that the organizing agent is unable to control the actions of the service agent, thus creating a 'decentralized problem' which leads to an inefficient overall system. Exemplary embodiments herein, provide a solution to the decentralized problem in which the service agent controls the behavior of its supply and the organizing agent controls the incentives offered in accordance with the exemplary embodiments can provide a solution that is arbitrarily close to the globally-optimized solution.

Figure 3:
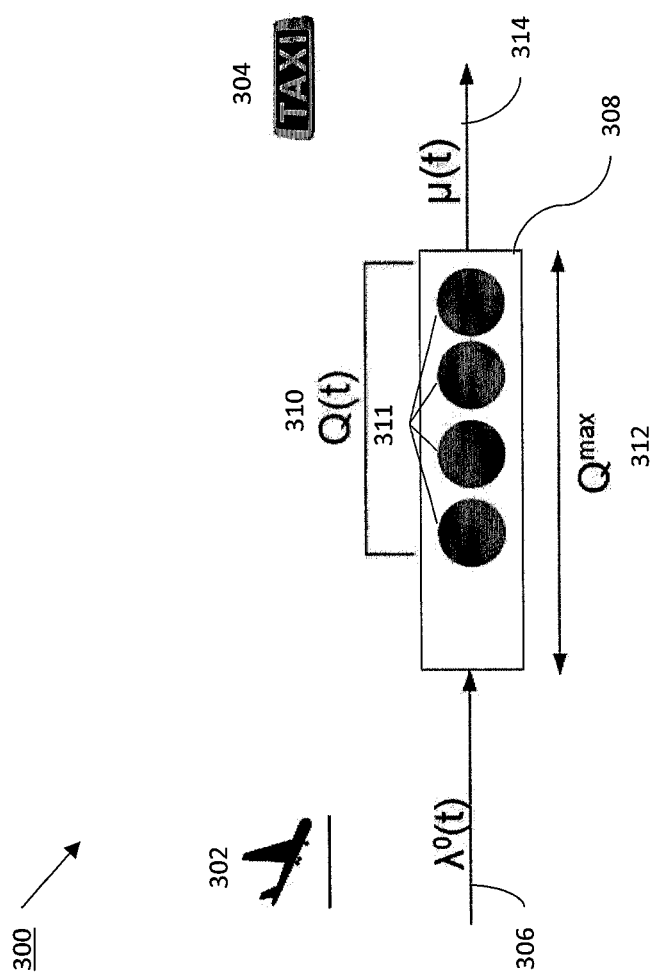
FIG. 3 is a flow diagram of an example system showing customers of an operating agent entering and exiting a queue of a service agent in accordance with exemplary embodiments.

Referring now to FIG. 3, this figure shows an example system including an organizing agent and a service agent. In the example shown in FIG. 3 the organizing agent is an airport 302 and the service agent is a taxi service 304, however these examples are merely illustrative and FIG. 3 also is applicable to other service agents and/or organizing agents. The rate of arriving passengers 306 is represented through a locally Poisson Process with intensity $\lambda^o(t)$. The number of people waiting in line for the service agent is shown by the queue 308, where the circles 311 represent individual customers or users in the queue. The length of the queue at a given time 310 is denoted by Q(t) and the maximum capacity 312 of the queue is denoted by $Q^{max}$. Finally, service rate 314 of the taxi service (e.g. how many taxis are available) at a given time is denoted μ(t).

Figure 4:
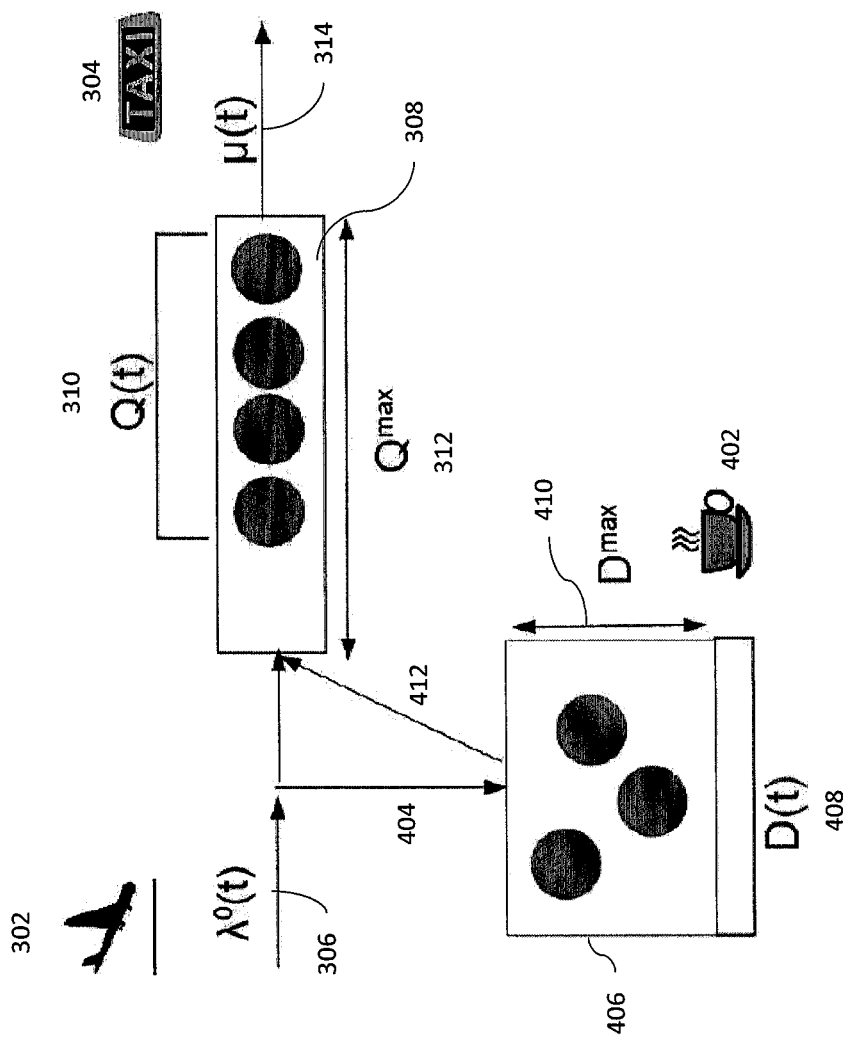
FIG. 4 is a flow diagram of the example system shown in FIG. 3 where some customers are diverted to a diversion before entering a queue of a service agent in accordance with exemplary embodiments.

Referring now to FIG. 4, this figure shows the example system 300 from FIG. 3 where the system further includes a 'diversion' in accordance with exemplary embodiments. In the non-limiting example shown in FIG. 4, the diversion 402 is a coffee shop. According to embodiments, it is assumed that the organizing agent 302 knows the rate of arriving customers, namely, intensity $\lambda^o(t)$. In order to influence the behavior of the passengers, the organizing agent 302 may modify the utility of customers, by enticing a given customer to go to the diversion 402 in various different ways. For instance, the organizing agent can provide a discount or a bonus to those passengers who accept to perform an alternate activity for a given amount of time and then join the queue 308 at a later time. In FIG. 4, the passengers that are influenced are represented by arrow 404 and are diverted to the diversion 402. The queue of the diversion is shown at 406, which has a current length 408 (denoted by D(t)), and a diversion capacity 410 (denoted by $D^{max}$). When a passenger completes the diversion 402 then the passenger returns to the main queue 308 which is represented by arrow 412.

Arrival patterns for queues tend to be periodic, and the arrival distributions can typically be calibrated against historical data. When the expected wait times are particularly heavy then the overall performance of such a system may be improved by determining optimal incentives in combination with a diversion. For example, if it is estimated that the wait time of the taxi queue 308 is long, then other activities may be presented to passengers of that taxi service and those passengers can be redirected to the diversion 402 instead of joining the taxi queue 308 immediately. The passengers may be enticed to be redirected if the passengers reap some benefit associated with the diversion. This bonus, or incentive, compensates for the loss of time for people who accept to take the diversion. The value of the incentive is denoted by and may be paid by the organizing agent to the customer, if the customer takes the diversion. After completing the diversion, the passengers may then rejoin the taxi queue at a later time when the queue is less busy.

Similar to influencing passengers to take a diversion, the airport is also in a position to request more taxis to serve the arriving passengers by making a request to the taxi operators. However, the taxi drivers are be willing to come only if there are sufficient passengers to serve in the queue. Hence, each actor in the system has their own objective to optimize in terms of costs and benefits to be accrued. For example, the taxis wish to gain the revenue from serving passengers; the airport wishes to improve the service level for the passengers by minimizing their waiting time in the queue. The airport also benefits when their facilities (coffee shops, duty free retail stores) are used, and are thus in a position to incentivize the passengers to go to these facilities. Finally, passengers have an objective of improving their net utility which includes the wait time in the queue as well as potential benefits from the diversion activity.

Figure 5:
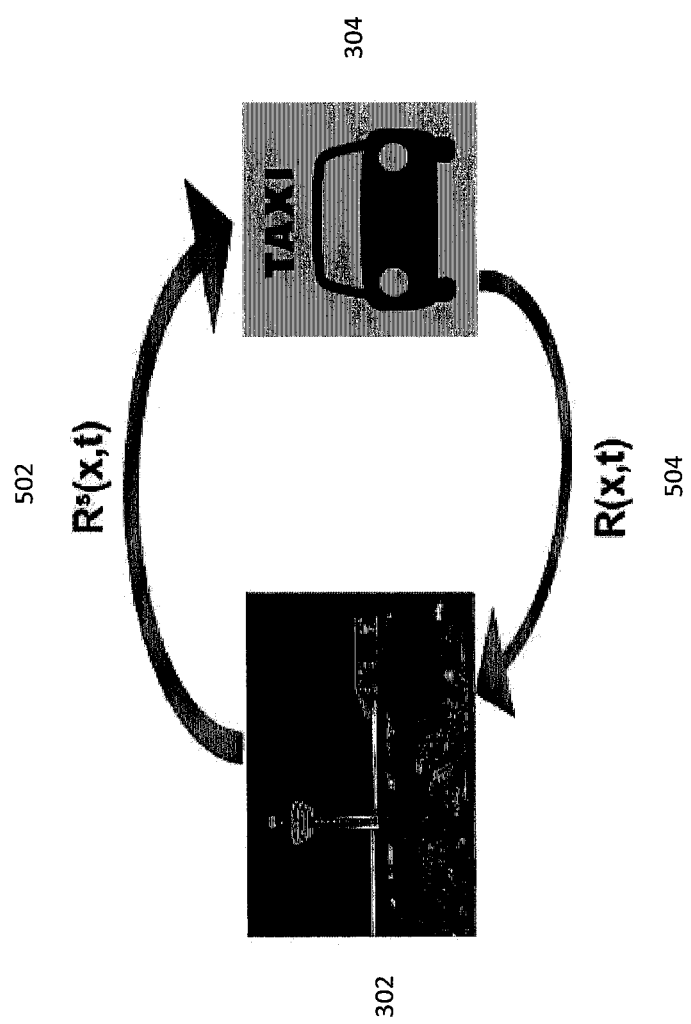
FIG. 5 shown an example transfer contract between an organizing agent and a service agent in accordance with exemplary embodiments.

Embodiments described herein address this decentralized problem by applying 'transfer contracts' between the various actors in the system. Referring also to FIG. 5, this figure illustrates an example transfer contract between the airport 302 and the taxi service 304. Certain events performed by a customer trigger compensation to transfer from the airport 302 to the taxi service 304 as shown by arrow 502; other event performed by a customer trigger compensation to be transferred from the taxi service 304 to the airport 302 as shown by arrow 504. The events that trigger these transfers are discussed in more detail below.

Figure 6:
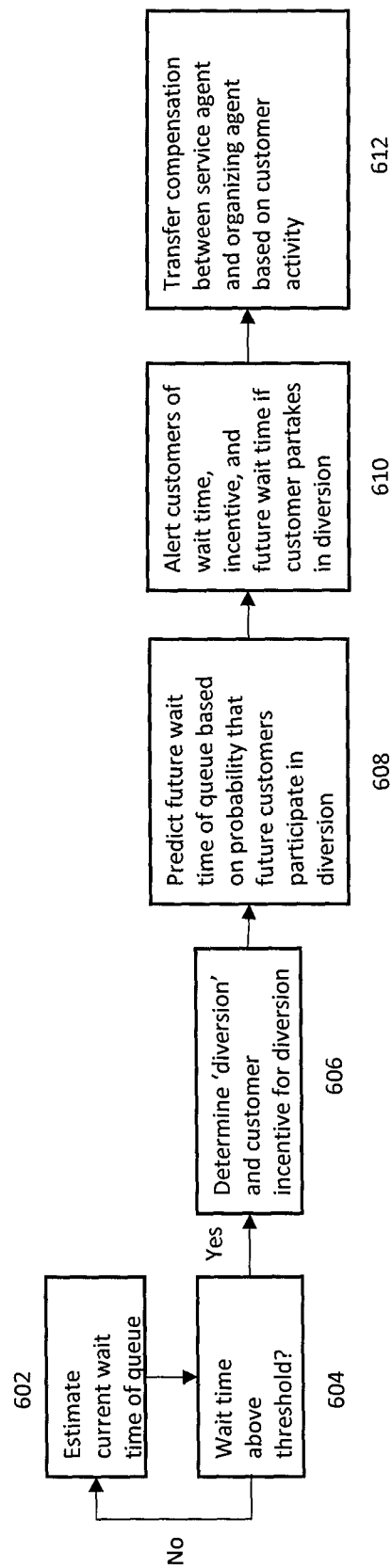
FIG. 6 is a process flow diagram showing a simplified overview of an example system according to embodiments.

Referring now to FIG. 6, this figure provides a process flow diagram showing a simplified overview of an example system according to embodiments. At 602, a current wait time of a queue is estimated based on the state of the system. For example, an organizing agent may utilize various sensors (e.g. sensor 114 of FIG. 1), such as cameras or motion detectors in an airport for example, to detect the current state of the system. The organizing agent may also utilize data on different servers, such as flight manifest information and/or historical data for example, to estimate the customer arrival rate. In some embodiments, further information may be obtained from mobile application, such as a taxi application of the service agent. In some embodiments, the organizing agent may determine how quickly the service agent may serve customers based on, for example, the number of taxis entering the airport based on the various sensors. For example, the number of taxies could be estimated based on RFID tags, gantries with tag counters, video, or the like. At 602, the estimated wait time is compared to a threshold value. If the estimated wait time is above the threshold value, then a diversion is determined as well as an incentive for the diversion. For example, the incentive a deduced or free entry into the diversion (e.g. an attraction), free coffee, a coupon for a shop, etc. These If the estimated wait time is below the threshold value then no incentive is needed, and flow proceeds back to 602. At block 608, the future wait time of the queue is predicted based on a probability that one or more future customers participate in the diversion. In this sense, the future wait time includes a type of feedback loop where the future wait time depends on how many people accept to take the incentive and the diversion. At 610, the customers are presented with the current wait time, the incentive, and the future wait time if a customer were to partake in the diversion. Then, at block 612 compensation is transferred between the organizing agent and the service agent depending on the customer activity.

The following section provide further details on these steps. In particular, an example ideal system is first described where the service agent and organizing agent each operate to optimize the overall system. An example decentralized system where the service agent controls the behavior of its supply and the organizing agent controls the incentives is then described.

Ideal System

In general, for all $t \in [0,T]$ we denote $Q(t)$ the number of people in the queue and $D(t)$ the number of people in the diversion. The state of the system may be represented by $X(t)=(Q(t),D(t)) \in \chi \subset \mathbb{N}^2$ where the admissible state space=$\{(q,d), 0 \leq q \leq Q^{max}, 0 \leq d \leq D^{max}, q+d \leq S^{max}\}$. $Q^{max}$, $D^{max}$ and $S^{max}$ are respectively the capacity of the queue, the diversion and the whole system (queue and diversion). At time t and any state $x \in \chi$ we denote $p(t,x,\beta)$ the probability that an arriving customer chooses the diversion. Henceforth, we use capital letters $X=(Q,D)$ to refer to the random variables and lowercase $x=(q,d)$ to refer to a particular state of the system.

Starting from the state $$x = \begin{pmatrix} q \\ d \end{pmatrix},$$

one of tour events can occur:

event a: a new customer arrives and goes directly into the service queue. That is:

$$x = \begin{pmatrix} q \\ d \end{pmatrix} \to x^a = \begin{pmatrix} q+1 \\ d \end{pmatrix}.$$

This event occurs according to a locally Poisson process $N^a(t)$ with intensity $\lambda^a(t,x,\beta)=[1-p(t,\beta,x)]\lambda^0(t)$.

event b: a new customer arrives and enters the diversion. That is:

$$x = \begin{pmatrix} q \\ d \end{pmatrix} \to x^b = \begin{pmatrix} q \\ d+1 \end{pmatrix}$$

This event occurs according to a locally Poisson process with intensity $\lambda^b(t,x,\beta)=p(t,\beta,x)\lambda^0(t)$ event c: a customer leaves the diversion and enters the service queue. That is:

$$x = \begin{pmatrix} q \\ d \end{pmatrix} \to x^c = \begin{pmatrix} q+1 \\ d-1 \end{pmatrix}.$$

We assume that the time spent in the diversion is also a random variable following an exponential distribution with parameter $$\frac{1}{\tau},$$

so that $\tau$ represents the mean time spent in the diversion. We may then represent the number of customers leaving the diversion by a locally Poisson process $N^c(t)$ with intensity $$\lambda^c(t,x) = \frac{d(t)}{\tau}.$$

event s: a customer is served and thus leaves the service queue. That is:

$$x = \begin{pmatrix} q \\ d \end{pmatrix} \to x^s = \begin{pmatrix} q-1 \\ d \end{pmatrix}.$$

This event occurs according to a locally Poisson process $N^s(t)$ with intensity $\mu(t)$.

Theoretically, the system may be represented as a two dimensional random walk with specific boundaries and transition probabilities. In what follows we denote by $$\Lambda(t,\beta,x) = \begin{pmatrix} \lambda^a(t,\beta,x) \\ \lambda^b(t,\beta,x) \\ \frac{d(t)}{\tau} \end{pmatrix} \quad (1)$$

the intensity vector for the three events occurring before service a, b and c. If one of the boundaries of the admissible state X is reached, at least one of the events a, b, c and s is not permitted. In that case the transition probability for this event is set to zero and the others remain unchanged (except for the case $q=Q^{max}$ where we suppose that $\lambda^a=\lambda^0$, $\lambda^b=0$, that is, all the new customers join directly the queue). The notation $\Lambda(t,\beta,x)$ is extended to those cases and similarly we extend the notations $x^a, x^b, x^c$ denoting $x^a=x$ if a is not possible from state x for example. Further, we denote $\mathcal{F}_0=\{(0,d), 0 \le d < D^{max}\}$ the boundary when the service queue is empty. The dynamics of the queueing system are thus as follows:

$$\begin{cases} dQ(r) = dN^a(r) + dN^c(r) - dN^s(r) \\ dD(r) = dN^b(r) - dN^c(r) \\ X(r) = (Q(r), D(r)) \in \chi \\ \text{where } N^a, N^b, N^c, N^s \text{ are locally Poisson Processes with} \\ \text{respective intensities } \lambda^a(r, X(r), \beta(r)), \lambda^b(r, X(r), \beta(r)), \\ \lambda^c(r, X(r)) \text{ and } \mu(r) \end{cases} \quad (2)$$

Introducing the diversion allows a reduction to the time people spend waiting for a service with an activity that also provides some degree of benefit to the customer. The efficiency of the system thus depends on the capacity of the organizing agent to control the probability that an arriving customer enters the service queue. Equivalently, the organizing agent wishes to control the probability that a customer chooses the diversion, $p(t,\beta(t),x(t))$, through judiciously setting the parameter $\beta$ which represents the incentive offered to the customer. In the remainder of the paper we assume that $\beta \in [0, \beta^{max}]$.

An important component of the formulation is the definition of the function $\beta \mapsto p(t,\beta(t),x(t))$. A simple model would result from assuming that p depends only on $\beta$, i.e., that is the customer choice to take the diversion or not depends only on the value of the incentive. This approach gives a bijection $\beta \mapsto p(\beta)$ between [0,1] and $[p_{min}, p_{max}]$, which allows for straightforward control of the parameter p. While mathematically simpler, customer choice is not driven only by the monetary value of the incentive but to a large degree by the waiting time that would be incurred if one or the other choice is made.

Accordingly, the optimal solution accounts for the utility each customer receives when the customer takes the diversion which depends on both the actual waiting time as well as the expected waiting time in the service queue after the diversion. The organizing agent predicts and announces these two values: the current waiting time and the expected waiting time after $\tau$ units of time. We denote $u^a(t,x(t))$ the utility experienced by a customer going directly to the service queue and $u^b(t,x(t),\beta(t))$ the utility of choosing the diversion. These utilities depend on the moment t the choice is made and the state x(t) at this instant. The probability that a customer chooses the diversion can be modeled through an exponential weight function (for ease of understanding, the parameters of the functions $u^a$ and $u^b$ are omitted):

$$p(t, x, \beta(t)) = \frac{e^{u_b}}{e^{u_a} + e^{u_b}} = \frac{1}{1 + e^{u_a - u_b}}. \quad (3)$$

We consider that $u_a$, and $u_b$ have the following shape:

$$u_a(t, x) = -f_a\left(\frac{q(t)+1}{\bar{\mu}}\right) \quad (4)$$

$$u_b(t, x, \beta(t)) = -f_b\left(\frac{Q(t+\tau)+1}{\bar{\mu}}\right) + U^b + \beta(t) \quad (5)$$

where:
- $f_a(\Delta t)$ is the cost of waiting $\Delta t$ units of time when joining the queue immediately,
- $f_b(\Delta t)$ is the cost of waiting $\Delta t$ units of time when joining the queue after the diversion,
- The organizing agent must thus predict the waiting time for an individual who would accept to take the diversion and return to the queue at time $t+\tau$. Assuming that the service rate is a given constant $\bar{\mu}$, one obtains:

$$\frac{q(t)+1}{\bar{\mu}}$$

for the waiting time of someone joining the queue at time t.

$$\frac{Q(t+\tau)+1}{\bar{\mu}}$$

for the waiting time of someone joining the queue at time $t+\tau$.

$U^b$ is the mean utility provided to the customers by the diversion itself, and is negative if time spent in the diversion decreases customer utility.

At time t the computation of $Q(t+\tau)$ is not straightforward: regardless of the stochastic uncertainty, at time t, the value of $E(Q_{t+\tau}|X_t=x)$ cannot be known a priori as it depends on the diversion probability p during the time interval $[t, t+\tau]$. Assume $\tilde{Q}$ is an estimator of $(t,x) \mapsto E(Q_{t+\tau}|X_t=x)$ given by a function $\tilde{Q}:[0,T] \times \chi \to [0, Q^{max}]$ which is $\mathcal{F}_t$ measurable, that is $\tilde{Q}(t,x)$ only depends on the current state x and t (Assumption 1).

In order to optimize the overall system it is assumed that the organizing agent is able to control both of the key variables: $\beta(t), \mu(t)$. We consider that the system receives a fixed amount of benefit $p_s$ each time a customer is served and must pay the costs of providing the service level $\mu$, as well as requiring its customers to wait in the queue. In order to incentivize the customers to accept the diversion, the organizing agent spends $\beta(t)$ each time a customer takes the diversion. In what follows we will use without distinction for $\beta$: $\beta(t)$ and $\beta(t,X(t))$ and similarly for $\mu$: $\mu(t)$ and $\mu(t,X(t))$.

The expected profit of the system can then be expressed as a dynamic control problem on the interval $[0,T]$:

$$\begin{cases} \max_{\beta,\mu} E\left[\int_0^T p_s dN^s(r) - \int_0^T [c(\mu(r)) + \alpha Q(r)] dr - \int_0^T \beta(r) dN^b(r) - h(x(T))\right] \\ X(r) = (Q(r), D(r)) \in \chi \; \forall \, r \in [0, T] \\ \text{the system dynamics are given by equation (2)} \\ X(0) = (q_0, d_0) \\ \beta \in \mathcal{B}, \mu \in \mathcal{M} \end{cases} \quad (6)$$

where:

- $p_s$ is the mean profit the service provider earns for every customer it serves.
- $c(\mu)$ is the cost to the service provider when it offers the service rate $\mu$. We assume that c is a continuous increasing function.
- $\alpha$ is the cost experienced by the organizing agent per unit of waiting time per customer.
- $h(x(T))$ represents the cost of the remaining customers in the system at the time T. We assume h is non-negative and non-decreasing in q(T) and d(T).

The organizing agent's strategy $\beta$ as well as $\mu$, the strategy of the service agent, must satisfy the following conditions (Assumption 2):

$\beta \in \mathcal{B} := \{\beta:[0,T] \times \chi \to [0,\beta^{max}],$ $\beta(.,x)$ is measurable on $[0,T] \forall x \in \chi\}$ $\mu \in \mathcal{M} := \{\mu:[0,T] \times \chi \to [\mu^{min},\mu^{max}],$ $\mu(.,x)$ is measurable on $[0,T] \forall x \in \chi\}$.

Next, a more compact set of notation is introduced to simplify the description of the embodiments. For $x \in \chi$, we denote $\Delta_a V(t,x) = V(t,x) = V(t,x)$ for event a, and define $\Delta_b V(t,x)$, $\Delta_c V(t,x)$ and $\Delta_s V(t,x)$ analogously for events b, c and s.

In addition, the events a, b and c are denoted:

$$\Delta V(t,x) = \begin{pmatrix} \Delta_a V(t,x) \\ \Delta_b V(t,x) \\ \Delta_c V(t,x) \end{pmatrix}. \qquad (7)$$

Finally we use $e_1$, $e_2$ and $e_3$ to denote the basis vectors. $\forall t \in [0,T[$, $x \in \chi$ we now define $V(t,x)$, the optimal value of the system starting from the state x at time t, by:

$$\begin{cases} V(t,x) = \max_{\beta,\mu} E\left[\int_t^T p_s dN^s(r) - \int_t^T \beta(r) dN^b(r) - \\ \int_t^T [c(\mu(r)) + \alpha Q(r)] dr - h(x(T))\right] \\ \text{the system dynamics are given by (2)} \\ X(t) = x \\ \beta \in \mathcal{B}, \mu \in \mathcal{M} \end{cases} \qquad (8)$$

It is also assumed that there exists V(t,x) which verifies $\forall t \in [0,T]$ and for all $x \in \chi$:

$$-\frac{dV(t,x)}{dt} = \qquad (9)$$

$\max_{\beta,\mu} \Lambda(t,\beta,x) \cdot [\Delta V(t,x) - \beta e_2] + \mu[p_s + \Delta_s V(t,x)] - c(\mu) - \alpha q$ $V(T,x) = -h(x),$ and thus prove the following result.

Theorem 1: Suppose that there exists a function V(t,x) which verifies $\forall t \in [0,T[$ and for all $x \in \chi_{int}$:

$$-\frac{dV(t,x)}{dt} = \qquad (10)$$

$\max_{\beta,\mu} \Lambda(t,\beta,x) \cdot [\Delta V(t,x) - \beta e_2] + \mu[p_s + \Delta_s V(t,x)] - c(\mu) - \alpha q.$ Furthermore, let for t=T:

$V(T,x) = -h(x) \qquad (11)$

Assume for $x \in \mathcal{F}_0$, the function V verifies the following:

$$-\frac{dV(t,x)}{dt} = \max_\beta \Lambda(t,\beta,x) \cdot [\Delta V(t,x) - \beta e_2] - c(\mu^{min})$$

Assume further that there exists a solution in $B \times \mathcal{M}$ to the following maximization (13) $\forall t \in [0,T]$, $x \in \chi$:

$(\beta^*(t,x), \mu^*(t,x)) =$ $\operatorname*{argmax}_{\beta,\mu} \mu[p_s + \Delta_s V(t,x)] + \Lambda(t,\beta,x) \cdot [\Delta V(t,x) - \beta e_2] - c(\mu)$ Then, the corresponding ($\beta^*,\mu^*$) is the optimal solution of problem (6).

Decentralized System

In practice, the organizing agent is likely not able to control the service rate. Rather, the organizing agent controls only the $\beta$ and the service agent controls $\mu$. The goal of the organizing agent is to reduce the congestion in the queue and to limit the amount of incentives paid out. As for the service agent, its aim is to serve a maximum of customers while limiting the service rate. To handle such circumstances, embodiments herein provide a decentralized control policy.

The organizing agent knows the actual state of the system x(t), and can estimate the customer arrival rate $\lambda^0(t)$ for all $t \in [0,T]$.

The organizing agent also controls the value of the incentive $\beta$, but need not know the policy of the service agent in that it knows neither $c(\mu)$, $p_s$ nor $\mu(t)$ and only has an estimate of the service rate $\tilde{\mu}$. For the organizing agent the system dynamics are:

$$\begin{cases} dQ(r) = dN^a(r) + dN^c(r) - d\tilde{N}^s(r) \\ dD(r) = dN^b(r) - dN^c(r) \\ (Q(r), D(r)) \in \chi \end{cases} \qquad (A1)$$

where $\tilde{N}^s$ is a Poisson process with intensity $\tilde{\mu} \in \mathcal{M}$.

The service agent also knows the state of the system x(t), as well as $p_s$ and $c(\mu)$, but does not know the organizing agent's strategy $\beta$, the function $p(t,\beta,x)$ or the primary arrival rate $\lambda^0(t)$. Thus, the service agent has only an estimate of $\Lambda(t,x,\beta)$. This estimate is denoted $\tilde{\Lambda}(t,x,\beta)$. Hence, according to the service agent, the system follows the dynamics (A2):

$$\begin{cases} dQ(r) = d\tilde{N}^a(r) + d\tilde{N}^c(r) - dN^s(r) \\ dD(r) = d\tilde{N}^b(r) - d\tilde{N}^c(r) \\ (Q(r), D(r)) \in \chi \end{cases} \qquad (A2)$$

where $\tilde{N}^a$, $\tilde{N}^b$ and $\tilde{N}^c$ are Poisson processes with intensity $(\tilde{\lambda}^a(t), \tilde{\lambda}^b(t), \tilde{\lambda}^c(t)) \in \mathcal{L}$, defined on $[0,T] \times \chi$, measurable and bounded.

Without any contract between the organizing agent and the service agent, the optimal solution for the service agent is to find the optimal policy $\mu(t)$ to maximize its profit, regardless of the length of the queue $Q(t)$ (except when $Q(t)=0$). Therefore, according to exemplary embodiments, a transfer contract mechanism is used to ensure that the two agents will not act selfishly to the detriment of the system as a whole. We denote $R(t,x) \in \mathbb{R}^3$ the transfer prices payed by the service agent to the organizing agent when one of the events a, b or c occurs. This way, the service agent compensates the organizing agent's loss for a customer waiting in the queue. On the other hand, when a customer is served, the organizing agent will pay the service agent an amount $R_s(t,x)$. Thus, R and $R_s$ are internal cash transfers and their values are known by both agents. In what follows we show how to design these transfer contracts to reach the optimal centralized solution.

The maximum profit of the organizing agent for the period $[0,T]$ with transfer contracts can be written as:

$$\begin{cases} \hat{V}_1(t,x) = \max_{\beta \in \mathcal{B}} E\left[-\int_t^T \alpha Q(r)dr - \int_t^T \beta(r)dN^b(r) + \right. \\ \left. \int_t^T R(r,x) \cdot \begin{pmatrix} dN_a \\ (dN^b)(r) \\ dN^c \end{pmatrix} - \int_t^T R_s(r,x)d\tilde{N}^s(r) - \right. \\ \left. h(x(T))\right] \\ X(t) = x \\ \text{the system dynamics are given by } (A1) \forall r \in [t,T] \end{cases} \quad (B1)$$

Similarly, the maximum profit of the service agent is given by $$\begin{cases} \hat{V}_2(t,x) = \max_{\mu \in \mathcal{M}} E\left[\int_t^T (p_s + R_s(r,x))dN^s(r) - \right. \\ \left. \int_t^T c(\mu(r))dr - \int_t^T R(r,x) \cdot \begin{pmatrix} d\tilde{N}_a \\ (d\tilde{N}^b)(r) \\ d\tilde{N}^c \end{pmatrix}\right] \\ X(t) = x \\ \text{the system dynamics are given by } (A2) \forall r \in [t,T] \end{cases} \quad (B2)$$

The optimal policies of the organizing and service agents are denoted $\beta^*(t,x,R,R_s)$ and $\mu^*(t,x,R,R_s)$ respectively.
The global value of the decentralized system is given by:

$$\begin{cases} \hat{V}(t,x,,R,R_s) = E\left[\int_t^T p_s dN^s(r) - \int_t^T \beta(r)dN^b(r) - \right. \\ \left. \int_t^T [c(\mu(r)) + \alpha Q(r)]dr - h(x(T))\right] \\ X(t) = x \\ \text{the system dynamics are (2)} \\ \beta \text{ optimal for } (2)(B1), \mu \text{ optimal for } (2)(B1)(B2) \end{cases} \quad (14)$$

The following proposition (Proposition 1) states that the decentralized system cannot be more efficient than the centralized one: $\forall x \in \chi$, $t \in [0,1]$ and $R,R_s$ given, we have $$\hat{V}(t,x,R,R_s) \leq V(t,x) \quad (15)$$

where $\hat{V}(t,x,R,R_s)$ is defined in (14) and $V(t,x)$ in (8).

According to exemplary embodiments, the optimal transfer contracts R and $R_s$ are provided so that the inequality in (15) holds with equality. We define $V_1$ and $V_2$ from the optimal value of the centralized system V in (10) (with boundary condition (12)). We thus wish to split the expression (10) in two parts:

$$-\frac{dV(t,x)}{dt} = \max_{\beta,\mu} A_1(t,x,\beta,V) + A_2(t,x,\mu,V) \quad (16)$$

where $$A_1(t,x,\beta,V) = \Lambda(t,\beta,x) \cdot [\Delta V(t,x) - \beta e_2] - \alpha q \quad (17)$$

and $$A_2(t,x,\mu,V) = \mu(t)[p_s + \Delta_s V(t,x)] - c(\mu(t)). \quad (18)$$

In this way we separate the terms in (10) that depend only on $\beta$ from those depending only on $\mu$. We can now redefine $V_1$ and $V_2$.

$$\begin{cases} -\frac{dV_1(t,x)}{dt} = \max_\beta A_1(t,x,\beta,V) \\ V_1(T,x) = -h(x) \ \forall x \in \chi \end{cases} \quad (C1)$$

$$\begin{cases} -\frac{dV_2(t,x)}{dt} = \begin{cases} \max_\mu A_2(t,x,\mu,V) & \text{if } x \in \chi \setminus \mathcal{F}_{\cdot 0} \\ -c(\mu^{min}) & \text{if } x \in \mathcal{F}_{\cdot 0} \end{cases} \\ V_2(T,x) = 0 \ \forall x \in \chi \end{cases} \quad (C2)$$

We then have the following proposition: Let $V_1$ and $V_2$ be defined by (C1), (C2) and (8), we have (Proposition 2):

$$\forall x \in \chi, t \in [0,1] \ V_1(t,x) + V(t,x). \quad (19)$$

Using $V_1$ and $V_2$ defined explicitly in (C1) and (C2), let us now define our candidate for the optimal transfer contracts. We prove that this definition is indeed optimal.

$$\begin{cases} R(t,x) = \begin{pmatrix} R_a \\ R_b \\ R_c \end{pmatrix} = \Delta V_2(t,x) \\ R_s(t,x) = \Delta_s V_1(t,x) \end{cases} \quad (20)$$

Using (19), (C1) and (C2) can be rewritten using our implicit definition:

$$\begin{cases} -\frac{dV_1(t,x)}{dt} = \max_\beta A_1(t,x,\beta,V_1+V_2) \\ V_1(T,x) = -h(x) \ \forall x \in \chi \end{cases} \quad (D1)$$

$$\begin{cases} -\frac{dV_2(t,x)}{dt} = \begin{cases} \max_\mu A_2(t,x,\mu,V_1+V_2) & \text{if } x \in \chi \setminus \mathcal{F}_{\cdot 0} \\ -c(\mu^{min}) & \text{if } x \in \mathcal{F}_{\cdot 0} \end{cases} \\ V_2(T,x) = 0 \ \forall x \in \chi \end{cases} \quad (D2)$$

The definition of system R and $R_s$ (20) are substituted into (D1) and (D2) to obtain (E1) and (E2):

$$\begin{cases} -\dfrac{dV_1(t,x)}{dt} = \max_{\beta} \Lambda(t,\beta,x) \cdot [\Delta V_1(t,x) - \beta e_2 + R(t,x)] - \\ \alpha q + \tilde{\mu}(t)[\Delta_s V_1(t,x) - R_s(t,x)] \\ V_1(T,x) = -h(x) \; \forall \, x \in \chi \end{cases} \quad (E1)$$

$$\begin{cases} -\dfrac{dV_2(t,x)}{dt} = \begin{cases} \max_{\mu} \mu(t)[p_s + \Delta_s V_2(t,x) + R_s(t,x)] + \\ \tilde{\Lambda}(t,\tilde{\beta},x) \cdot [\Delta V_2(t,x) - R(t,x)] - \\ c(\mu(r)) \text{ if } x \in \chi \setminus \mathcal{F}_{\cdot 0} - \\ c(\mu^{min}) \text{ if } x \in \mathcal{F}_{\cdot 0} \end{cases} \\ V_2(T,x) = 0 \; \forall \, x \in \chi \end{cases} \quad (E2)$$

It is important to note that the system {(C1), (C2), (20)} gives an explicit definition of R and $R_s$ and so proves their existence. However, it can be solved only if V is known, which means knowing all the parameters of the system. The implicit system {(E1), (E2), (20)} is thus needed to ensure that the solution can be found even if we do not know V.

The following theorem states that using the transfer contracts defined in (20) the decentralized system is as efficient as the centralized one. Theorem 2: Let {(C1), (C2), (20)} define $V_1$, $V_2$, R and $R_s$. Let $\tilde{\mu} \in \mathcal{M}$ and $\tilde{\Lambda} \in \mathcal{L}$ be arbitrary functions. Then:

1. $V_1(t,x) + V_2(t,x) = V(t,x)$
2. Under contracts R and $R_s$,
   $V_1$ is the value function of the organizing agent defined in (B1).
   $V_2$ is the value function of the service agent defined in (B2).
   $V_1$ and $V_2$ are independent of $\tilde{\mu}$ and $\tilde{\Lambda}(t,\tilde{\beta},x)$.
3. Let $\beta^*(t,x,R,R_s)$ and $\mu^*(t,x,R,R_s)$ be the optimal values of $\beta$ and $\mu$ for (B1) and (B2) where R, $R_s$ are defined in (20).

The tuple $(\beta^*(t,x,R,R_s), \mu^*(t,x,R,R_s))$ is optimal for the centralized problem. Thus the equality is achieved in Proposition 1:

$\hat{V}(t,x,R,R_s) = V(t,x)$ where V is defined in (8).

It is noted that that the definition in (20) implies that one should compute the value of the centralized system V. However, in some embodiments for a decentralized system where V is not known, an iterative algorithm can be used to compute the values of $R_s$ and R through an exchange process between the two agents.

The property that enables the optimality of the transfer contract to be proved is the separability of the two control variables $\mu$ and $\beta$ expressed in (16). Note also that the approximation $\tilde{\mu}$ and $\tilde{\Lambda}(t,\tilde{\beta},x)$ chosen by both agents to describe the strategy of the other agent does not impact the centralized problem or on the optimal transfer contract definition. This means that the system is robust to possible errors on the assessment on the partner's strategy.

Numerical Examples

Some simplified non-limiting examples are now provided in accordance with exemplary embodiments. These examples are described with reference to the parameters shown in Table 1 below:

TABLE I

| | Value | Description |
|---|---|---|
| $Q^{max}$, $D^{max}$ | 30, 20 | capacity of queue, diversion |
| $S^{max}$ | 50 | capacity of the system |
| T | 80 | time horizon |
| $\tau$ | 10 | mean time in diversion |
| $\lambda^0$ | $\lambda \in \{6, 3\}$ | cust. arrival rate (peak/offpeak) |
| $f_a$ | $f_a(\delta t) = \delta t$ | wait cost of $\delta t$ time pts for a |
| $f_b$ | $f_b(\delta t) = \delta t$ | wait cost of $\delta t$ time pts for b |
| $U_b$ | −4 | utility of the diversion |
| $\beta$ | $\beta(t) \in [0, 3]$ | value of incentive |
| $\mu$ | $\mu(t) = 5$ | service rate |
| or | $\mu(t) \in [3, 5.5]$ | |
| $\alpha$ | 1 | cost/unit wait time per cust. borne by the organizing agent |
| $p_s$ | 50 | profit per cust. served |
| c | $c(\mu) = \mu^2$ | cost fcn. of service agent |
| h | $h(x) = q$ | cost of unserved cust. at T |

$\lambda^0$ is the customer arrival rate into the system and is assumed to have periodic peaks, with $\lambda_{peak}^0 = 6$ and $\lambda_{offpeak}^0 = 3$. In this example, a simple estimator for the $\tau$-anticipated waiting time: we assume here that if the queue is well managed, after $\tau$ time units the number of customers in the queue will on average be equal to the average number of people waiting in a queue with constant arrival and service rates. That is, it will be equal to the number of people waiting in a queue with arrival rate $$\bar{\lambda} = \frac{1}{T}\int_0^T \lambda(t)dt$$

and service rate $$\bar{\mu} = \frac{1}{T}\int_0^T \mu(t)dt.$$

Hence, we can set:

$$\tilde{Q}(t+\tau, x) = \frac{\bar{\lambda}}{\bar{\mu} - \bar{\lambda}}. \quad (21)$$

In this simplified case, the anticipated waiting time depends neither on the current waiting time nor on state x.

Figure 7A:
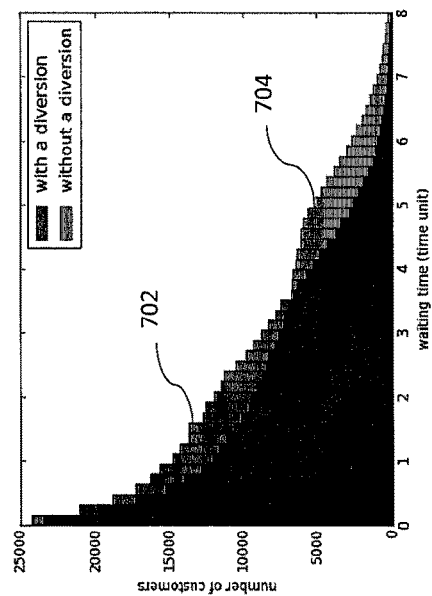
FIGS. 7A and 7B show histograms of customer wait time using fixed and variable service rates in accordance with exemplary embodiments.

Centralized System: We first evaluate the benefits in an ideal system that can be achieved by introducing the diversion. We simulate 1000 instances of the model and compare the waiting times of customers with and without the diversion. To assess the benefit of the diversion without the impact of service rate optimization, we fix $\mu := 5$. Referring now to FIG. 7A, this figure shows a histogram of customer wait time using the fixed service rate $\mu$. The number of customers is on the y-axis, and the waiting time is shown on the x-axis (in time units, e.g. minutes). The darker region 702 is the wait times with a diversion and lighter shaded portion 704 is the wait times without the use of a diversion. As can be seen, use of the diversion shifts the wait times to the left (i.e. the wait times are shorter) which improves the overall performance of the system.

Figure 7B:
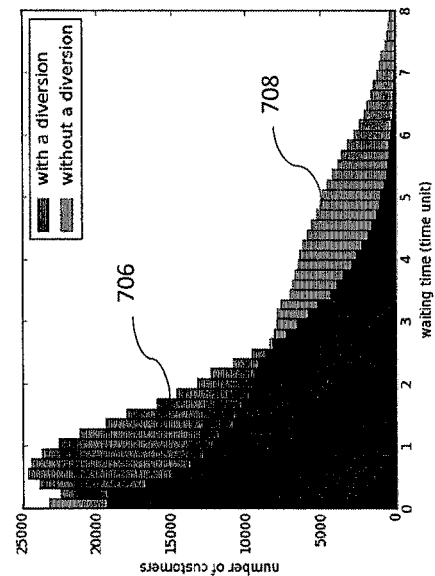

FIG. 7B is shows another histogram of customer wait time using a variable service rate $\mu$. In this example, the service rate $\mu \in [3,5]$). When compared to the FIG. 7A, the benefit is even greater. In particular, the distribution of wait times is skewed more sharply to the left as shown by the darker shaded region 706 (i.e. wait times including the diversion) and the lighter shaded region 708 (i.e. wait times without use of a diversion). The benefit to the service agent is also improved: very low wait times (less than 0.5 time units) are reduced as well, skewing the distribution to an optimum with a peak around 1 time unit.

Decentralized system. The benefits of a diversion in the decentralized system are now explored. The decentralized problem may be solved as follows:

Determine the optimal value of the centralized system $V(t,x)$ $\forall t \in [0,T]$ and $x \in \chi$.

Using V, determine $V_2$ as defined in (C2).

Using Proposition 2 determine $V1=V-V_2$.

Finally calculate the optimal contracts R and $R_s$ as defined in (20)

$$\begin{cases} R(t, x) = \begin{pmatrix} R_a \\ R_b \\ R_c \end{pmatrix} = \Delta V_2(t, x) \\ R_s(t, x) = \Delta_s V_1(t, x) \end{cases}.$$

Figure 8:
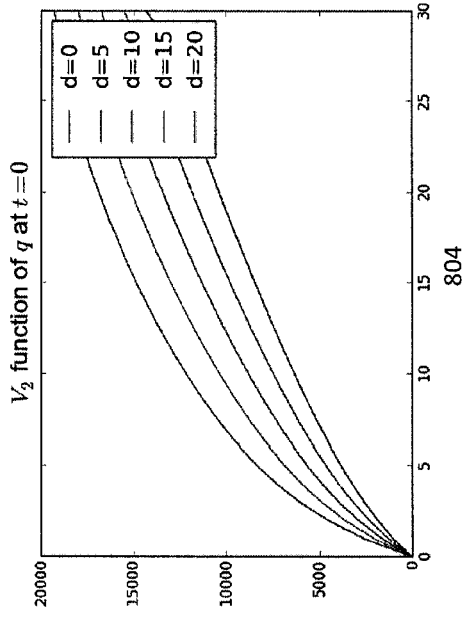
FIG. 8 are graphs showing the objective functions of a service agent and an organizing agent in accordance with exemplary embodiments.
Figure 8:
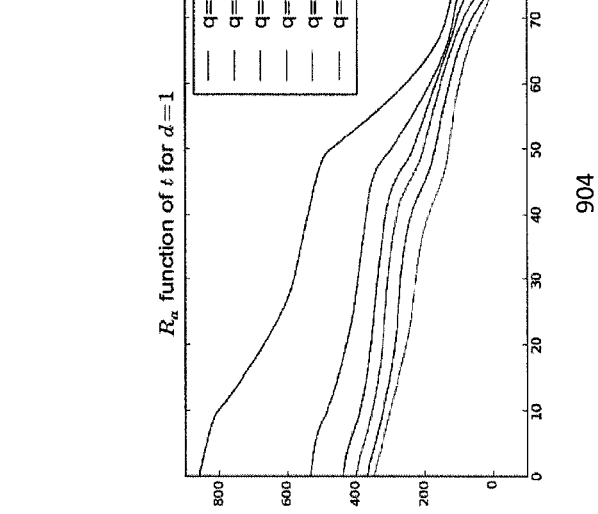

FIG. 8 illustrates two graphs showing the objective functions of the two agents. Graph 802 shows the objective function, $V_1$, and graph 802 shown the objective function $V_2$. Note that the more customers there are in the system (be it in the queue or the diversion), the lower the value function $V_1$ of the organizing agent. This is as expected since the organizing agent bears the cost of congestion in the queue. On the contrary, $V_2$ increases with the number of customers in the system.

Figure 9:
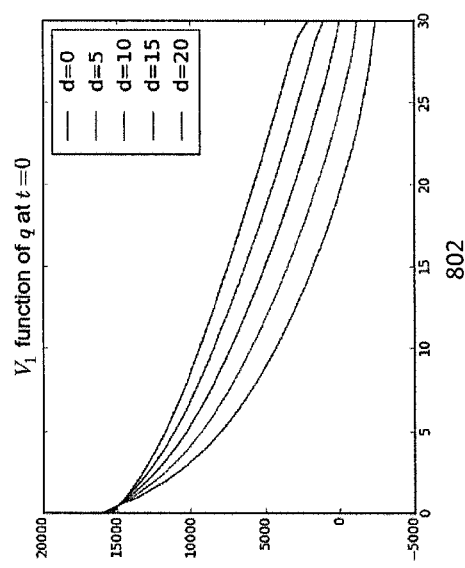
Figure 9:
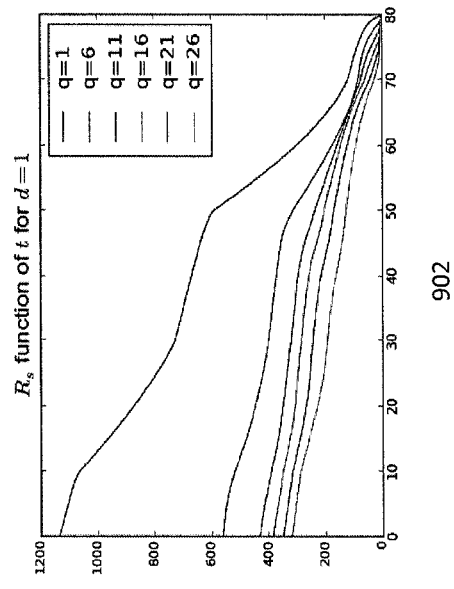

FIGS. 9 and 10 illustrate examples graphs showing transfer contract values according to exemplary embodiments. FIG. 9 includes a graph 902 showing the contract values for $R_s$, for several values of q, and graph 904 shows the contract values for values of $R_a$ over time. FIG. 10 includes a graph 1002 showing the contract values for $R_s$, for several values of q, and graph 1004 shows the contract values for values of $R_a$ over time. Note that in each graphs the contract values decrease over time. This is natural as an event occurring at time t will have repercussions on the future value of the system ($s \in [t,T]$). Note that contract values (except $R_b$) decrease with q. One may expect that the more congested the queue, the higher the reward given to the service agent. However, the organizing agent needs to prompt the service agent to increase its service rate μ when it has little interest to do so (e.g. the queue is relatively short).

FIG. 11 shows examples graphs showing the cost transfer between the organizing agent and the service agent. The left graph 1102, we see that the contract price for event a of entering the main queue is roughly the same as that of using the diversion, events b and c. This confirms intuition; the service agent is agnostic to the use of the diversion. On the other hand, while the contract values exchanged between the two parties are roughly equivalent for intermediate values of q (10-25), the cost paid by the organizing agent is higher for very low values of q and vice-versa when the queue length increases. Looking at event a only confirms this: the transfers primarily cancel each other except at very low values of the queue, where the organizing agent has to incite the service agent to take the risk of potentially arriving with no customers to serve, and very high values of q, where the service provider compensates the organizing agent for the long queue.

Figure 12:
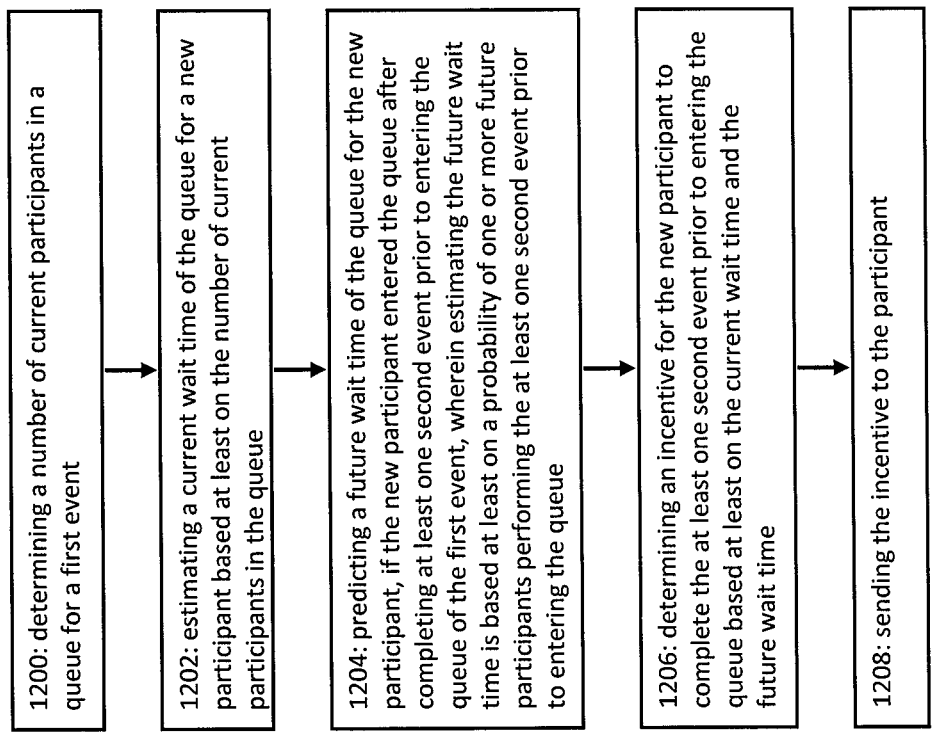
FIG. 12 is a logic flow diagram for determining optimal incentives for customers to reduce queueing wait time with wait-time-dependent incentive choice probabilities, and illustrates the operation of an exemplary method, a result of execution of computer program instructions embodied on a computer readable memory, functions performed by logic implemented in hardware, and/or interconnected means for performing functions in accordance with exemplary embodiments.

Referring now to FIG. 12, this figure is a logic flow diagram for determining optimal incentives for customers to reduce queueing wait time with wait-time-dependent incentive choice probabilities. FIG. 12 illustrates the operation of an exemplary method, a result of execution of computer program instructions embodied on a computer readable memory, functions performed by logic implemented in hardware, and/or interconnected means for performing functions in accordance with exemplary embodiments. It is assumed that one or more computing systems, such as computer system 200 of FIG. 2, performs the blocks in FIG. 12.

Referring to FIG. 12, an example method may comprise determining a number of current customers in a queue for a first event as indicated by block 1200; estimating a current wait time of the queue for a new customer based at least on the number of current customers in the queue as indicated by block 1202; predicting a future wait time of the queue for the new customer, if the new customer entered the queue after completing at least one second event prior to entering the queue of the first event, wherein estimating the future wait time may be based at least on a probability of one or more future customers performing the at least one second event prior to entering the queue as indicated by block 1204; determining an incentive for the new customer to complete the at least one second event prior to entering the queue based at least on the current wait time and the future wait time as indicated by block 1206; and sending the incentive to the customer as indicated by block 1208.

The method may comprise causing reception of at least one signal from at least one sensor, wherein determining the number of current customers in the queue may be based on the at least one signal from the at least one sensor. The sensor may include at least one of: a motion sensor, a proximity sensor, and an image sensor.

The method may comprises transmitting an indication of at least one of: the wait time, and the future wait time to a user device of the new customer.

The method may comprise causing a transfer of compensation to an operator of the first event when a customer leaves the queue of the first event.

The method may comprise transferring compensation to an operator of the second event when at least one of following occurs: a customer directly enters the queue; a customer performs the second event prior to entering the queue of the first event; and a customer leaves the second event and enters the queue of the first event.

Predicting the future waiting time may be based on at least one of estimating a rate of customers entering the queue for the first event; and estimating a rate of customers leaving the queue for the first event. The method may further comprise: querying a database to retrieve information relating to at least one of: historical data of the first event; and scheduling data of the first event, wherein the rate of customers leaving the queue and/or the rate of customers entering the queue may be based on at least one of the historical data, and the scheduling data.

An example embodiment may be provided in an apparatus, such as shown in FIG. 2 for example. The apparatus may comprise one or more memories comprising computer-readable code, and one or more processors, wherein the one or more processors may be configured, in response to execution of the computer-readable code, to cause the apparatus to: determine a number of current customers in a queue for a first event; estimate a current wait time of the queue for a new customer based at least on the number of current customers in the queue; predict a future wait time of the queue for the new customer, if the new customer entered the queue after completing at least one second event prior to entering the queue of the first event, wherein estimating the future wait time may be based at least on a probability of one or more future customers performing the at least one second event prior to entering the queue; determine an incentive for the new customer to complete the at least one second event prior to entering the queue based at least on the current wait time and the future wait time; and send the incentive to the customer.

The one or more processors may be configured, in response to execution of the computer-readable code, to cause the apparatus to: cause reception of at least one signal from at least one sensor, wherein determining the number of current customers in the queue may be based on the at least one signal from the at least one sensor. The sensor may be at least one of: a motion sensor, a proximity sensor, and an image sensor. The one or more processors may be configured, in response to execution of the computer-readable code, to cause the apparatus to: transmit an indication of at least one of: the wait time, and the future wait time to a user device of the new customer. The one or more processors may be configured, in response to execution of the computer-readable code, to cause the apparatus to: cause a transfer of compensation to an operator of the first event when a customer leaves the queue of the first event. The one or more processors may be configured, in response to execution of the computer-readable code, to cause the apparatus to transfer compensation to an operator of the second event when at least one of following occurs: a customer directly enters the queue; a customer performs the second event prior to entering the queue of the first event; and a customer leaves the second event and enters the queue of the first event. The prediction of the future waiting time is based on at least one of: estimation of a rate of customers entering the queue for the first event; and estimation of a rate of customers leaving the queue for the first event. The one or more processors may be configured, in response to execution of the computer-readable code, to cause the apparatus to: query a database to retrieve information relating to at least one of: historical data of the first event; and scheduling data of the first event, wherein the rate of customers leaving the queue and/or the rate of customers entering the queue may be based on at least one of the historical data, and the scheduling data.

In an example embodiment, a computer program product may be provided for determining optimal incentives for customers to reduce queueing wait time with wait-time-dependent incentive choice probabilities. The computer program product may include a computer readable storage medium having program instructions embodied therewith, the program instructions executable by a device to cause the device to: determine a number of current customers in a queue for a first event; estimate a current wait time of the queue for a new customer based at least on the number of current customers in the queue; predict a future wait time of the queue for the new customer, if the new customer entered the queue after completing at least one second event prior to entering the queue of the first event, wherein estimating the future wait time may be based at least on a probability of one or more future customers performing the at least one second event prior to entering the queue; determine an incentive for the new customer to complete the at least one second event prior to entering the queue based at least on the current wait time and the future wait time; and send the incentive to the customer.

The device may be further caused to: cause reception of at least one signal from at least one sensor, wherein determining the number of current customers in the queue is based on the at least one signal from the at least one sensor. The sensor may include at least one of: a motion sensor, a proximity sensor, and an image sensor. The device may be further caused to: transmit an indication of at least one of: the wait time, and the future wait time to a user device of the new customer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
providing at least one sensor, wherein the at least one sensor comprises at least one of a motion sensor, a proximity sensor, or an image sensor;
receiving, at one or more processors, at least one signal from the at least one sensor;
determining, by the one or more processors, a number of current customers in a queue for a first event based on the at least one signal from the at least one sensor;
estimating, by the one or more processors, a current wait time of the queue for a new customer based at least on the determined number of current customers in the queue;
calculating, by the one or more processors, a utility experienced by one or more future new customers for directly entering the queue for the first event without first choosing at least one diversion based at least on a cost of waiting when joining the queue immediately, wherein the cost of waiting when joining the queue immediately is determined based on a size of the queue at a future time divided by a service rate of the queue;
calculating, by the one or more processors, a utility experienced by the one or more future new customers for choosing the at least one diversion before entering the queue for the first event based on a summation of at least i) a cost of waiting when joining the queue after participating in the at least one diversion, ii) a mean utility provided to the one or more future customers by the diversion itself, and iii) a value of an incentive for participating in the at least one diversion, wherein the cost of waiting when joining the queue after participating in the at least one diversion is based on a size of the queue after a mean time spent participating in the at least one diversion divided by the service rate of the queue, and wherein the mean utility is based at least on an amount of time spent in the diversion;
determining, by the one or more processors, a probability of one or more future customers participating in at least one diversion prior to entering the queue using the exponential weight function $e^{u(b)}/(e^{u(a)}+e^{u(b)})$, wherein e is the base of the natural logarithm, u(b) is the calculated utility experienced by the one or more future new customers for choosing the at least one diversion, and u(a) is the calculated utility experienced by the one or more future new customers for directly entering the queue for the first event without first choosing the at least one diversion;
determining, by the one or more processors, a rate of arrival of the one or more future new customers at the at least one diversion as a product of the determined probability and a rate of arrival at the queue for the first event;
determining, by the one or more processors, an expected rate of future new customers arriving and entering the queue for the first event without first choosing the at least one diversion by subtracting the determined rate of arrival of the one or more future new customers at the at least one diversion from the rate of arrival at the queue for the first event;
predicting, by the one or more processors, a future wait time of the queue for the new customer based upon the determined expected rate of future new customers arriving and entering the queue for the first event without first choosing at least one diversion;

determining, by the one or more processors, the value of the incentive for the new customer to participate in the at least one diversion prior to entering the queue based at least on the estimated current wait time and the predicted future wait time;

sending, by the one or more processors, the incentive to a user device of the new customer; and transferring, by the one or more processors, compensation to an operator providing the at least one diversion when at least one of following occurs:

a customer participates in the at least one diversion prior to joining the queue of the first event; or a customer leaves the at least one diversion and joins the queue of the first event.

2. The method of claim 1, further comprising:

transmitting, by the one or more processors, an indication of at least one of the current wait time or the future wait time to the user device of the new customer.

3. The method of claim 1, further comprising:

transferring, by the one or more processors, compensation to an operator providing the first event when a customer leaves the queue of the first event.

4. The method of claim 1, wherein predicting the future wait time is further based on an estimated rate of customers leaving the queue for the first event.

5. The method of claim 4, further comprising:

querying, by the one or more processors, a database to retrieve information relating to at least one of historical data of the first event or scheduling data of the first event, wherein the rate of customers leaving the queue and/or the rate of arrival at the queue is based on at least one of the historical data or the scheduling data.

6. The method of claim 1, wherein the mean utility provided to the one or more future customers by the diversion itself is further based at least on the value of the incentive for participating in the at least one diversion.

7. An apparatus comprising:

one or more memories comprising computer-readable code, one or more sensors, wherein the one or more sensors comprises at least one of a motion sensor, a proximity sensor, or an image sensor, and one or more processors, wherein the one or more processors are configured, in response to execution of the computer-readable code, to cause the apparatus to:

receive at least one signal from the at least one sensor;

determine a number of current customers in a queue for a first event based on the at least one signal from the at least one sensor;

estimate a current wait time of the queue for a new customer based at least on the determined number of current customers in the queue;

calculate a utility experienced by one or more future new customers for directly entering the queue for the first event without first choosing at least one diversion based at least on a cost of waiting when joining the queue immediately, wherein the cost of waiting when joining the queue immediately is determined based on a size of the queue at a future time divided by a service rate of the queue;

calculate a utility experienced by the one or more future new customers for choosing the at least one diversion before entering the queue for the first event based on a summation of at least i) a cost of waiting when joining the queue after participating in the at least one diversion, ii) a mean utility provided to the one or more future customers by the diversion itself, and iii) a value of an incentive for participating in the at least one diversion, wherein the cost of waiting when joining the queue after participating in the at least one diversion is based on a size of the queue after a mean time spent participating in the at least one diversion divided by the service rate of the queue, and wherein the mean utility is based at least on an amount of time spent in the diversion;

determine a probability of one or more future customers participating in at least one diversion prior to entering the queue using the exponential weight function $e^{u(b)}/(e^{u(a)}+e^{u(b)})$, wherein e is the base of the natural logarithm, u(b) is the calculated utility experienced by the one or more future new customers for choosing the at least one diversion, and u(a) is the calculated utility experienced by the one or more future new customers for directly entering the queue for the first event without first choosing the at least one diversion;

determine a rate of arrival of the one or more future new customers at the at least one diversion as a product of the determined probability and a rate of arrival at the queue for the first event;

determine an expected rate of future new customers arriving and entering the queue for the first event without first choosing at least one diversion by subtracting the determined rate of arrival of the one or more future new customers at the at least one diversion from the rate of arrival at the queue for the first event;

predict a future wait time of the queue for the new customer based upon the determined expected rate of future new customers arriving and entering the queue for the first event without first choosing at least one diversion;

determine the value of the incentive for the new customer to participate in the at least one diversion prior to entering the queue based at least on the estimated current wait time and the predicted future wait time;

send the incentive to a user device of the new customer; and transfer compensation to an operator providing the at least one diversion when at least one of following occurs:

a customer participates in the diversion prior to joining the queue of the first event; or a customer leaves the at least one diversion and joins the queue of the first event.

8. The apparatus of claim 7, wherein the one or more processors are further configured, in response to execution of the computer-readable code, to cause the apparatus to:

transmit an indication of at least one of the current wait time or the future wait time to the user device of the new customer.

9. The apparatus of claim 7, wherein the one or more processors are further configured, in response to execution of the computer-readable code, to cause the apparatus to:

transfer compensation to an operator providing the first event when a customer leaves the queue of the first event.

10. The apparatus of claim 7, wherein the prediction of the future wait time is further based on an estimated rate of customers leaving the queue for the first event.

11. The apparatus of claim 10, wherein the one or more processors are further configured, in response to execution of the computer-readable code, to cause the apparatus to:
query a database to retrieve information relating to at least one of historical data of the first event or scheduling data of the first event,
wherein the rate of customers leaving the queue and/or the rate of arrival at the queue is based on at least one of the historical data or the scheduling data.

12. The apparatus of claim 7, wherein the mean utility provided to the one or more future customers by the diversion itself is further based at least on the value of the incentive for participating in the at least one diversion.

* * * * *